(No Model.)  2 Sheets—Sheet 1.

R. M. HUNTER.
ELECTRIC RAILWAY.

No. 384,576.　　　　　　　Patented June 12, 1888.

Attest:
Henry Drury.
E. M. Breckinrica

Inventor:

(No Model.) 2 Sheets—Sheet 2.

R. M. HUNTER.
ELECTRIC RAILWAY.

No. 384,576. Patented June 12, 1888.

Attest:
Henry Drury
E. M. Breckinread

Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 384,576, dated June 12, 1888.

Application filed October 5, 1887. Serial No. 251,525. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

My improvements relate to the arrangement of the storage-battery under the seats in a peculiar manner, whereby they may be easily inserted or removed.

In my construction of car for the storage-battery I provide the compartment under the seat with an open end, either in front or rear of the car or at both ends, and such opening or openings are preferably provided with covers or doors. Into this compartment suitable slides or carriages supporting the batteries are run, whereby the batteries may be easily inserted or withdrawn. The front or rear platform, or both, are preferably made narrow, so as to expose said openings on the ends and to enable the long slides to be drawn out. The space in front of the openings is preferably provided with an operating-platform to facilitate the handling of the slide in being inserted into the compartment.

Figure 2:
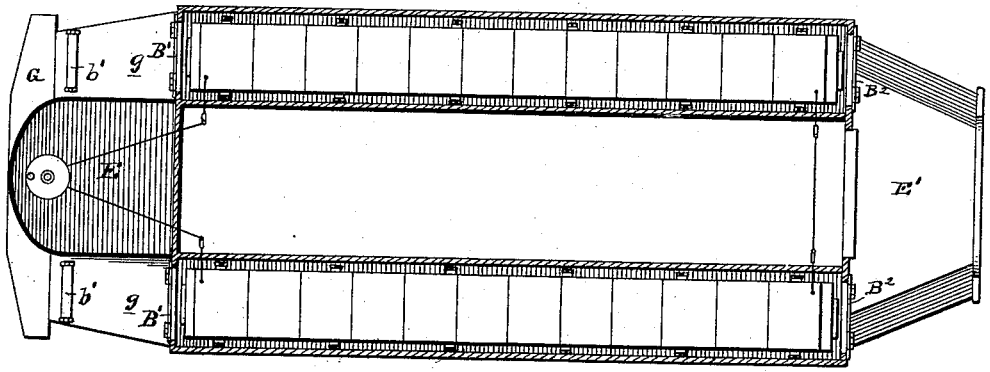
Figure 1:
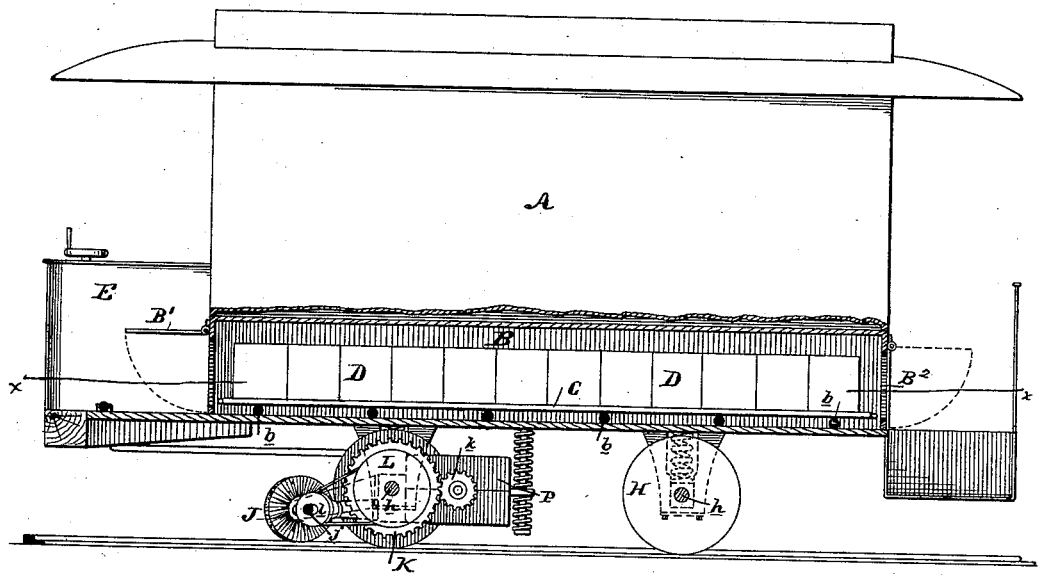
Figure 3:
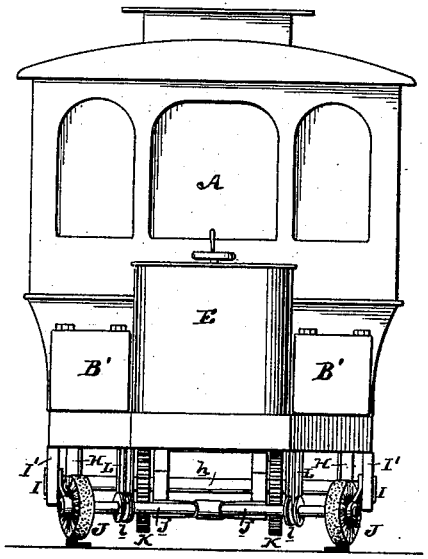

In the drawings, Figure 1 is a side elevation of the railway-car embodying my improvements, with part in section to show the batteries. Fig. 2 is a sectional plan view of same on line $x\ x$. Fig. 3 is a front elevation of same.

A is the car-body, and is supported upon springs in the usual manner.

B are the compartments under the seats, and have open ends B', and, if desired, B² also, and such openings may be covered by suitable doors or covers. The platforms E and E', or either or both of them, are made narrow, so as to enable the batteries to be drawn longitudinally out of the compartments through said openings.

Heretofore the operator's platform E, including the guard, was the full width of the car; but I form it of a width substantially equal to the distance between the two seats of the car, so as to form a clear space in front of the openings B'.

G is the cross-beam, in the front of the car below the platform, and $g$ are operating-platforms in front of said openings B', and may be provided with anti-friction rollers $b$ to facilitate the insertion or removal of the batteries. In case the batteries are to be drawn out of the rear ends, then the guard $e$ of the rear platform, E', must be made narrow or cut away, so as not to obstruct the passage of the batteries to or from the compartments.

It is evident that additional complicated features could be attached to said guard or platform to make it temporarily wider; but at the time of inserting or removing the batteries such parts would necessarily have to be removed, and are therefore not necessary to be considered. The compartment B is preferably provided with rollers $b$, upon which the long battery-slide C is received, as shown in Fig. 1, and this battery-slide C supports the battery D and enables its cells all to be removed or inserted in rapid succession. The rollers $b$ and sides of the compartments act as guides for the slides holding the batteries and hold them longitudinally in position on the car.

P is the electric motor, and is connected to the car-axle $h$ by suitable gearing, K $k$, or otherwise.

H are the car-wheels.

J are cleaning-brushes, which may be made of any suitable shape and material and hung from the car in any desired manner, so as to sweep the rails in front of the traction-wheels for the purpose of sweeping all dirt, dust, or snow from the track, and thereby enable the electrically-propelled vehicle to obtain a good firm grip upon the rail. The brushes may be held on a shaft, $j$, having a pulley, $l$, around which a band or chain passes to wheel L on the axle. I, however, do not claim the brush and its connections in this application.

I would here state that the particular details set out are in no wise limitations of my invention, and they may be modified or varied to suit the ideas of the engineer employing them.

In this application I do not claim the broad invention of compartments on the car with removable batteries therefor with or without doors to the compartments nor the arrangement of support of the batteries on the axles with relation to the electric motor, as said inventions form subject-matter of my applications No. 214,309 of 1886, No. 239,930 of 1887, and No. 240,880 of 1887; neither do I claim in this application the connection of the motor with the axle nor the elastic connection therefor, as said improvements form subject-matter of my applications No. 217,346 of 1886 and No. 216,643 of 1886.

Having now described my invention, what I claim as new, and desire to secure by Letters Patent, is—

1. An electric car having its front or operator's platform of a width equal to or substantially equal to the distance between the seats, and having the front ends of the compartments under the seats made open for the insertion of batteries within said compartments from the front end of the car.

2. An electric car having its front or operator's platform of a width equal to or substantially equal to the distance between the seats, having the front ends of the compartments under the seats made open for the insertion of batteries within said compartments from the front end of the car, and doors to cover the said openings.

3. An electric-car having its front or operator's platform of a width equal to or substantially equal to the distance between the seats, having the front ends of the compartments under the seats made open for the insertion of batteries within said compartments from the front end of the car, and a supporting-platform upon each side of said operator's platform, over which the batteries are pushed.

4. An electric car having its front or operator's platform of a width equal to or substantially equal to the distance between the seats, and having the front ends of the compartments under the seats made open for the insertion of batteries within said compartments from the front end of the car, and a supporting-platform provided with an anti-friction roller upon each side of said operator's platform, over which the batteries are pushed.

5. The combination, in a car, of the seat-compartments B, for the batteries having open ends, and a platform arranged between the openings in the ends, and long battery-supporting slides adapted to run into the seat-compartments.

6. An electric car having its front or operator's platform of a width equal to or substantially equal to the distance between the seats, having the front ends of the compartments under the seats made open for the insertion of batteries within said compartments from the front end of the car, in combination with long slides to run into said compartments, and cells of batteries on each of said slides.

7. An electric car having its front or operator's platform of a width equal to or substantially equal to the distance between the seats, and having the front ends of the compartments under the seats made open for the insertion of batteries within said compartments from the front end of the car, in combination with long slides to run into said compartments, rollers upon which said slides rest, and cells of batteries on each of said slides.

8. In an electric car, a compartment for the battery under the seat and open at one end and a platform-guard cut away or reduced in width at the open end of said compartment, in combination with batteries arranged in said compartment.

9. In an electric car, a compartment for the battery under the seat and open at one end, a platform-guard cut away or reduced in width at the open end of said compartment, in combination with batteries arranged in said compartment and a slide or carriage upon which said batteries rest and by which they are pushed into the compartment.

10. The combination of a car having a compartment under the seat running lengthwise with the car and having an opening at one end, a supporting or operating platform arranged immediately below said opening, and a passenger or operator's platform of a width sufficiently small as to not obstruct said opening, with a long slide to enter said compartment, and batteries arranged upon said slide.

11. The combination, in a car, of a seat-compartment running lengthwise of the car, an opening on the end of said compartment, a door for said opening supported within said compartment, and a removable battery-slide adapted to be moved into or out of said compartment through said opening and resting upon said supports.

12. The combination, in a car, of a seat-compartment running lengthwise of the car, an opening on each end of said compartment, a door for each of said opening-supports within said compartment, and a removable battery-slide adapted to be moved into or out of said compartment through said openings and resting upon said supports.

13. An electric car having a compartment exterior to the passenger-compartment, a removable door or cover to said compartment, two or more battery-cells, and a removable slide or support for said batteries, whereby said slide or support, with its batteries, may be simultaneously inserted or removed from the compartment through the door.

14. An electric car having a compartment exterior to the passenger-compartment, and having an opening extending to the outside of the car, a removable door or cover to the opening to said compartment, two or more battery-cells, and a removable slide or support for said batteries, whereby said slide or support, with its batteries, may be simultaneously inserted or removed from the compartment through the doorway to the outside of the car.

In testimony of which invention I hereunto set my hand.

RUDOLPH M. HUNTER.

Witnesses:
RICHD. S. CHILD, JR.,
E. M. BRECKINREED.

Corrections in Letters Patent No. 384,576.

It is hereby certified that in Letters Patent No. 384,576, granted June 12, 1888, upon the application of Rudolph M. Hunter, of Philadelphia, Pennsylvania, for an improvement in "Electric Railways," errors appear in the printed specification requiring correction, as follows: In line 96, page 2, a comma should be inserted after the word "opening," and the word "supported" should read *supports;* and in line 104, same page, the word "opening" should read *openings*, and the hyphen thereafter should be stricken out and a comma inserted instead; and that the said Letters Patent should be read with these corrections therein that the same may conform to the record of the case in the Patent Office.

Signed, countersigned, and sealed this 24th day of July, A. D. 1888.

[SEAL.]

D. L. HAWKINS,
*Assistant Secretary of the Interior.*

Countersigned:
    BENTON J. HALL,
        *Commissioner of Patents.*